(12) United States Patent
Mueller et al.

(10) Patent No.: US 7,910,191 B1
(45) Date of Patent: Mar. 22, 2011

(54) METHOD FOR FORMING LIGHT-TRANSMITTING COVER LAYER FOR OPTICAL RECORDING MEDIUM

(75) Inventors: William R. Mueller, LaVergne, TN (US); Ed Pickutoski, Blakely, PA (US)

(73) Assignee: Cinram International Inc., Scarborough (CA)

( * ) Notice: Subject to any disclaimer, the term of this patent is extended or adjusted under 35 U.S.C. 154(b) by 910 days.

(21) Appl. No.: 11/715,249

(22) Filed: Mar. 6, 2007

Related U.S. Application Data

(60) Provisional application No. 60/781,085, filed on Mar. 9, 2006.

(51) Int. Cl.
*B32B 3/02* (2006.01)

(52) U.S. Cl. ........................ 428/64.6; 369/283

(58) Field of Classification Search .................... None
See application file for complete search history.

(56) References Cited

U.S. PATENT DOCUMENTS

| | | |
|---|---|---|
| 4,995,799 A | 2/1991 | Hayashi et al. |
| 5,181,081 A | 1/1993 | Suhan |
| 5,247,494 A | 9/1993 | Ohno et al. |
| 5,303,224 A | 4/1994 | Chikuma et al. |
| 5,315,107 A | 5/1994 | Smith et al. |
| 5,457,746 A | 10/1995 | Dolphin |
| 5,486,396 A * | 1/1996 | Mizukuki et al. ............ 428/64.2 |
| 5,540,966 A | 7/1996 | Hintz |
| 5,766,359 A | 6/1998 | Sichmann et al. |
| 5,766,495 A | 6/1998 | Parette |
| 5,792,538 A | 8/1998 | Yurescko-Suhan |
| 5,800,687 A | 9/1998 | Kempf |
| 5,815,333 A | 9/1998 | Yamamoto et al. |
| 5,863,328 A | 1/1999 | Sichmann et al. |
| 5,863,399 A | 1/1999 | Sichmann |
| 5,900,098 A | 5/1999 | Mueller et al. |
| 5,905,798 A | 5/1999 | Nerlikar et al. |
| 5,913,653 A | 6/1999 | Kempf |
| 5,923,640 A | 7/1999 | Takemura et al. |
| 5,932,042 A | 8/1999 | Gensel et al. |
| 5,932,051 A | 8/1999 | Mueller et al. |
| 5,932,058 A | 8/1999 | Mueller |
| 5,935,673 A | 8/1999 | Mueller |
| 5,949,752 A | 9/1999 | Glynn et al. |
| 5,958,651 A | 9/1999 | Van Hoof et al. |
| 5,991,798 A | 11/1999 | Ozaki et al. |
| 5,995,481 A | 11/1999 | Mecca |
| 5,997,976 A | 12/1999 | Mueller et al. |
| 6,031,808 A | 2/2000 | Ueno |
| 6,035,329 A | 3/2000 | Mages et al. |
| 6,047,292 A | 4/2000 | Kelly et al. |
| 6,117,284 A | 9/2000 | Mueller |
| 6,124,011 A | 9/2000 | Kern |

(Continued)

OTHER PUBLICATIONS

White paper Blu-ray Disc Format, General, Aug. 2004.

(Continued)

*Primary Examiner* — Paul Huber
(74) *Attorney, Agent, or Firm* — Cooper & Dunham LLP

(57) ABSTRACT

A method for manufacturing an optical recording medium includes forming a light-transmitting cover layer over an information layer by depositing a predetermined volume of a liquid resin on the information layer. The method may further include forming a disc rib over an outer periphery of the information bearing side of the substrate, to stop flow of the deposited resin beyond the outer disc periphery. An optical recording medium formed through such a method includes a disc rib delimiting an outer diameter of the light-transmitting cover layer.

15 Claims, 3 Drawing Sheets

U.S. PATENT DOCUMENTS

| | | | |
|---|---|---|---|
| 6,160,787 | A | 12/2000 | Marquardt, Jr. et al. |
| 6,195,693 | B1 | 2/2001 | Berry et al. |
| 6,212,158 | B1 | 4/2001 | Ha et al. |
| 6,261,403 | B1 | 7/2001 | Gerigk et al. |
| 6,309,496 | B1 | 10/2001 | Van Hoof |
| 6,309,727 | B1 | 10/2001 | Mueller et al. |
| 6,317,407 | B1 | 11/2001 | Takemura et al. |
| 6,317,779 | B1 | 11/2001 | Gile et al. |
| 6,341,375 | B1 | 1/2002 | Watkins |
| 6,361,845 | B1 | 3/2002 | Kern |
| 6,368,435 | B1 | 4/2002 | Kempf |
| 6,396,798 | B1 | 5/2002 | Takemura et al. |
| 6,418,111 | B1 | 7/2002 | Takemura et al. |
| 6,438,232 | B1 | 8/2002 | Mages et al. |
| 6,440,248 | B1 | 8/2002 | Mueller |
| 6,480,462 | B2 | 11/2002 | Ha et al. |
| 6,527,538 | B1 | 3/2003 | Pickutoski et al. |
| 6,564,255 | B1 | 5/2003 | Mobini et al. |
| 6,580,683 | B1 | 6/2003 | Braitberg et al. |
| 6,587,424 | B2 | 7/2003 | Kuroda et al. |
| 6,628,603 | B1 | 9/2003 | Kam et al. |
| 6,678,237 | B1 | 1/2004 | Edwards et al. |
| 6,725,258 | B1 | 4/2004 | Bick et al. |
| 6,726,973 | B2 | 4/2004 | Mueller |
| 6,814,825 | B2 | 11/2004 | Becker et al. |
| 6,896,829 | B2 | 5/2005 | Kern et al. |
| 7,325,287 | B2 | 2/2008 | Sweeney |
| 7,419,045 | B2 | 9/2008 | Kelsch |
| 7,535,806 | B2 | 5/2009 | Fumanti |
| 7,564,771 | B2 | 7/2009 | Sweeney |
| 2001/0042111 | A1 | 11/2001 | Douzono |
| 2003/0229679 | A1 | 12/2003 | Yoo et al. |
| 2004/0002018 | A1 | 1/2004 | Oishi et al. |
| 2004/0032035 | A1* | 2/2004 | Mizuta .................. 264/1.33 |
| 2004/0044900 | A1 | 3/2004 | Wang et al. |
| 2004/0110087 | A1* | 6/2004 | Ozawa et al. ............ 430/270.13 |
| 2004/0134603 | A1 | 7/2004 | Kobayashi et al. |
| 2004/0184390 | A1 | 9/2004 | Oishi |
| 2004/0264361 | A1 | 12/2004 | Kondo |
| 2005/0031778 | A1 | 2/2005 | Inoue |
| 2005/0039675 | A1 | 2/2005 | Kang et al. |
| 2005/0042371 | A1 | 2/2005 | Ushida et al. |
| 2005/0048250 | A1 | 3/2005 | Yamaga et al. |
| 2005/0052985 | A1 | 3/2005 | Senshu et al. |
| 2005/0053728 | A1 | 3/2005 | Komaki |
| 2005/0053752 | A1 | 3/2005 | Komaki |
| 2005/0072336 | A1 | 4/2005 | Itoh et al. |
| 2005/0072518 | A1 | 4/2005 | Komaki et al. |
| 2005/0109454 | A1 | 5/2005 | Katoh et al. |
| 2005/0112319 | A1 | 5/2005 | Itoh et al. |
| 2005/0122892 | A1* | 6/2005 | Usami ...................... 369/275.4 |
| 2005/0132395 | A1 | 6/2005 | Hisada et al. |
| 2005/0147809 | A1 | 7/2005 | Hongo et al. |
| 2005/0158504 | A1 | 7/2005 | Itoh et al. |
| 2005/0175771 | A1 | 8/2005 | Hisada |
| 2005/0281179 | A1 | 12/2005 | Kang et al. |
| 2006/0023598 | A1 | 2/2006 | Babinski et al. |
| 2006/0035172 | A1* | 2/2006 | Tomura et al. .......... 430/270.16 |
| 2006/0073284 | A1* | 4/2006 | Usami et al. ................. 427/508 |
| 2006/0101634 | A1 | 5/2006 | Sweeney |
| 2006/0104190 | A1 | 5/2006 | Babinski |
| 2006/0165419 | A1 | 7/2006 | Musto |
| 2006/0181706 | A1 | 8/2006 | Sweeney |
| 2006/0222808 | A1 | 10/2006 | Pickutoski et al. |
| 2006/0270080 | A1 | 11/2006 | Rinaldi |
| 2006/0274617 | A1 | 12/2006 | Musto et al. |
| 2007/0008861 | A1 | 1/2007 | Fumanti |
| 2007/0014224 | A1 | 1/2007 | Sweeney |
| 2007/0029167 | A1 | 2/2007 | Kelsch |
| 2007/0090006 | A1 | 4/2007 | Kelsch |
| 2007/0098947 | A1* | 5/2007 | Mueller ...................... 428/64.4 |
| 2007/0136738 | A1* | 6/2007 | Lee et al. ...................... 720/721 |
| 2009/0141616 | A1* | 6/2009 | Noda et al. ................ 369/275.1 |

OTHER PUBLICATIONS

White Paper Blu-ray Disc Format, 1.C. Physical Format Specifications for BD-ROM, 3$^{rd}$ Edition, May 2005.
U.S. Appl. No. 11/705,682, filed Feb. 13, 2007.
U.S. Appl. No. 11/726,968, filed Mar. 22, 2007.
U.S. Appl. No. 11/705,682, filed Feb. 13, 2007 of Michael Parette.
U.S. Appl. No. 11/726,968, filed Mar. 22, 2007 of Lewis Gensel et al.
U.S. Appl. No. 11/936,625, filed Nov. 7, 2007 of Petrus Hubertus Van Hoof et al.
U.S. Appl. No. 11/938,572, filed Nov. 12, 2007 of Dominick A. Dallaverde et al.
U.S. Appl. No. 12/126,667, filed May 23, 2008 of Ed Pickutoski.

* cited by examiner

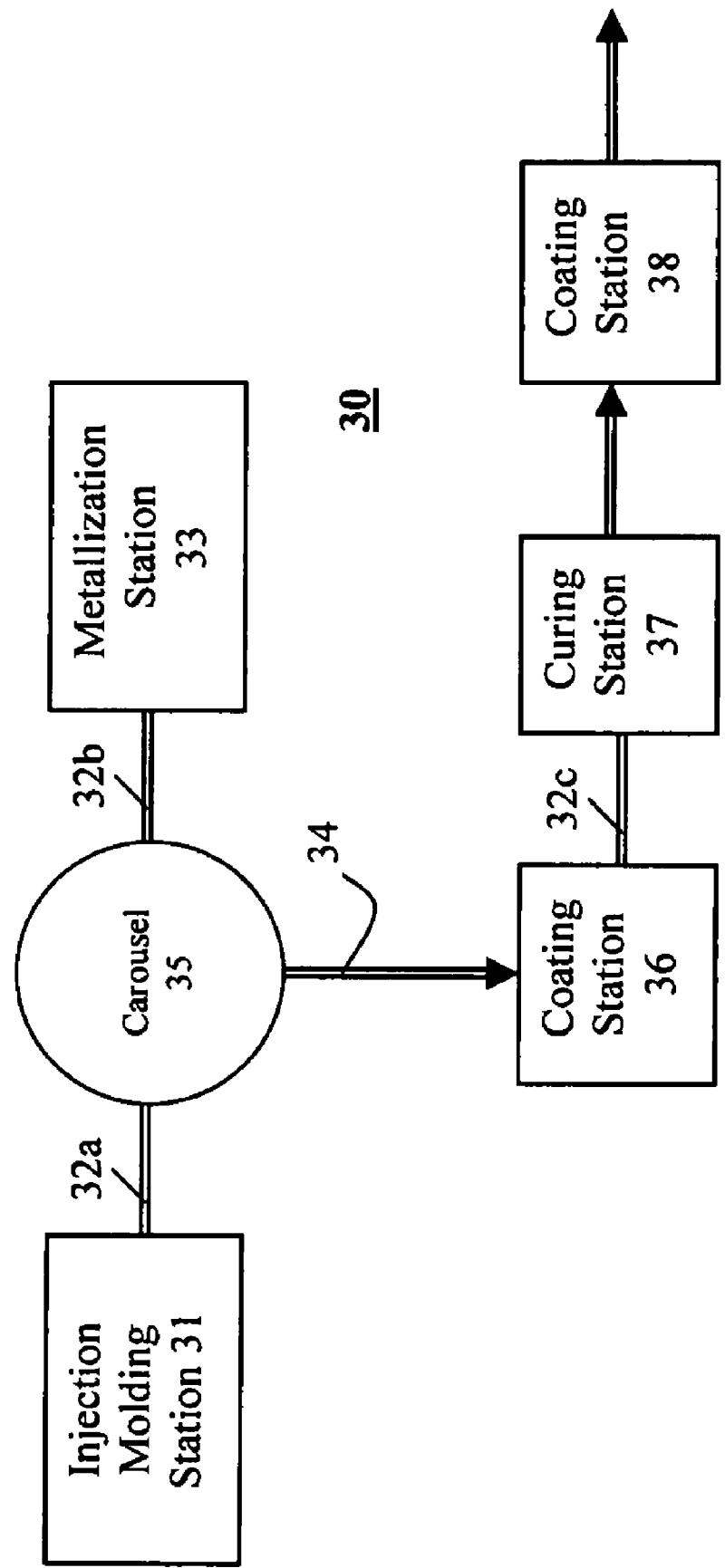

METHOD FOR FORMING LIGHT-TRANSMITTING COVER LAYER FOR OPTICAL RECORDING MEDIUM

CROSS-REFERENCE TO RELATED APPLICATION

This application claims the benefit of U.S. provisional application Ser. No. 60/781,085, filed Mar. 9, 2006, the entire contents of which are incorporated by reference herein.

TECHNICAL FIELD

This application relates to optical storage media. In particular, the application relates to a method for forming a thin light-transmitting cover layer over an information layer for an optical recording medium.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is pre-recorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master in a mastering process. A metallized glass master is used in an electroforming process to form (typically, metal) stampers. A stamper is used on one side of an injection molding cavity to emboss a layer of pits and lands on a transparent polymer substrate formed by injection molding. The information bearing surface of the substrate is then covered with a reflective film (of metal or alloy) or the like, to form an information layer. In the case of a CD, a plastic protective coating is applied over the reflective film, and then art (for example, a picture, a design, text, etc.) is typically printed on the upper surface of the disc (that is, on the side of the substrate which bears the information layer), to form an end product which is 1.2 mm thick. In the case of DVDs, two half-thickness substrates (that is, approximately 0.6 mm each) are typically formed, metallization is applied to one (for example, DVD-5) or both (for example, DVD-10, DVD-9, DVD-18) half-thickness substrates, and the two half-thickness substrates are bonded by an adhesive (for example, hotmelt adhesive, ultraviolet light-cured adhesive, etc.), with the information layer being shielded from the external environment by the half-thickness substrates as cover layers. A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include at least a recording layer, and in addition a reflective layer (of metal or alloy) and a protective layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to form irreversibly a pattern of marks or pits in the recording layer.

Each recording side of a rewritable disc also uses multiple layers beginning with a polycarbonate plastic substrate containing a shallow spiral groove extending from the inside to the outside diameter of the disc. A DVD-RW disc (or a DVD-RAM disc) may additionally inside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer in single-sided optical media. During recording of the rewritable optical medium, the laser selectively heats tiny areas of the recording track to change the phase of each heated area from more crystalline into less crystalline (also known as "amorphous") phase, in order to create marks that can be called "pits" (the term "pit" is used broadly herein to cover, for example, a pit in a read-only type optical disc, and a pit or mark in a recordable or rewritable optical disc). During erase, the laser (in a process called "annealing") changes the amorphous areas back into more crystalline areas.

Some exemplary optical disc manufacturing techniques (including methods, systems and apparatuses) are discussed in U.S. Pat. Nos. 5,181,081, 5,315,107, 5,766,495, 5,792,538, 5,900,098, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, 6,726,973 and 6,896,829, which are incorporated by reference herein in their entireties in order to more fully describe the state of the art as of the date of the subject matter described and claimed herein. Additional exemplary techniques are discussed in U.S. Pat. Nos. 4,995, 799, 5,766,359, 5,800,687, 5,863,328, 5,863,399, 5,913,653, 6,261,403, 6,368,435 and 6,814,825, which are also incorporated by reference herein in their entireties.

Optical disc players for optical discs which conform with one of the CD or DVD formats use a red laser (with a wavelength range of 635 nm to 660 nm in the case of DVD and a wavelength of approximately 780 nm in the case of CD).

Optical discs using a blue laser (with a wavelength range of 400 nm to 420 nm) have also been introduced, such as HD DVD and BD (each of which includes read-only, recordable and rewritable formats). The popularity of optical storage media driven by advancements in computer, information communication and multimedia technologies has been accompanied also by demands for a higher density and a greater capacity of optical storage media. HD DVD and BD provide high density formats which attempt to meet such demands.

HD-DVD format discs can be replicated using a process similar to the process for forming a DVD disc, except that the minimum pit length is shorter and therefore the laser beam recorder used in the mastering process must be adapted to form the shorter pits.

BD format discs have a substantially different structure than HD-DVD, DVD and CD discs. For HD-DVD, DVD and CD discs, each information layer is closer to the middle of the disc than the surface of the disc. In contrast, the information layer in the BD format disc is separated from the surface of the disc only by a 0.1 mm transparent cover layer.

A number of techniques have been proposed for forming the 0.1 mm cover layer on the information layer for the BD disc.

For example, the cover layer may be a disc-shape punch-out from a thin-layer plastic sheet. The disc-shape plastic punch-out is then bonded on the information layer, and therefore needs to have precise dimensions to cover the information layer. The plastic sheet may be a laminate sheet constituted by an adhesive sheet having a predetermined form which is laminated onto a release sheet and wound into a roll. See, for example, U.S. Patent Application Publication No. US2005/0109454A1. However, such plastic sheets substantially increase the cost of manufacture of the disc.

A number of spin coating techniques and apparatuses have been proposed for depositing a resinous material to form the cover layer on the information layer. See, for example, U.S. Patent Applications Publications Nos. US2005/0039675A1, US2005/0042371A1, US2005/0053728A1, US2005/0175771A1 and US2005/0281179A1. However, effective use of spin coating to form the cover layer has been very difficult. For example, controlling the thickness of the cover layer formed through spin coating has been problematic. Further, spin coating is a turbulent activity and therefore may result in bubbles in the cover layer which affect the light-transmitting property of the cover layer. In addition, spin coating techniques typically apply much more resin than is required to form the 0.1 mm cover layer, and the excess must be collected to avoid waste.

There is a need for improved techniques for forming a light-transmitting cover layer which does not have the limitations described above.

SUMMARY

This disclosure describes a method for manufacturing an optical recording medium which includes forming a light-transmitting cover layer over an information layer by depositing a predetermined volume of a liquid resin on the information layer. The method may further include forming a disc rib over an outer periphery of the information bearing side of the substrate, to stop flow of the deposited resin beyond the outer disc periphery. An optical recording medium formed through such a method includes a disc rib delimiting an outer diameter of the light-transmitting cover layer.

BRIEF DESCRIPTION OF THE DRAWINGS

The features of the present application can be more readily understood from the following detailed description with reference to the accompanying drawings wherein:

FIG. 3 shows a schematic diagram illustrating a system for manufacturing optical recording media.

DETAILED DESCRIPTION

Methods for manufacturing an optical recording medium, including in particular improved techniques for forming a light-transmitting cover layer (such as for a BD disc) of a specified thickness, are discussed herein.

In describing examples and exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

A method for manufacturing an optical recording medium, in an example of this disclosure, includes molding a substrate including an information bearing side (step S11), forming an information layer by applying a reflective layer over the information-bearing side of the substrate (step S13), and forming a light-transmitting cover layer over the information layer by depositing a predetermined volume of a liquid resin on the information layer (step S15). Some additional examples of the method are discussed infra.

The volume of the liquid resin that is deposited is predetermined based on a desired thickness of the cover layer. For example, an approximation of the required volume of the resin for a disc having a radius of 6 cm, an inner clamping area with a radius of 1 cm and a cover layer thickness of 0.1 mm is approximately 1.1 cm³ which can be determined as follows:

$$(\text{layer thickness}) \cdot \pi \cdot [(\text{disc radius})^2 - (\text{inner radius})^2].$$

In the example of a BD disc, a light-transmitting cover layer with a thickness of 0.1 mm is required with a tolerance of ±0.003 mm. Therefore, an approximation of the volume of resin to be dispensed is 1.1 cm³+0.011 cm³.

Accordingly, the desired light-transmitting cover layer for a disc can be formed by discharging a suitable volumetric amount of resin over the information layer, and controlling the flow to obtain relative flatness of the disc.

Figure 2A:
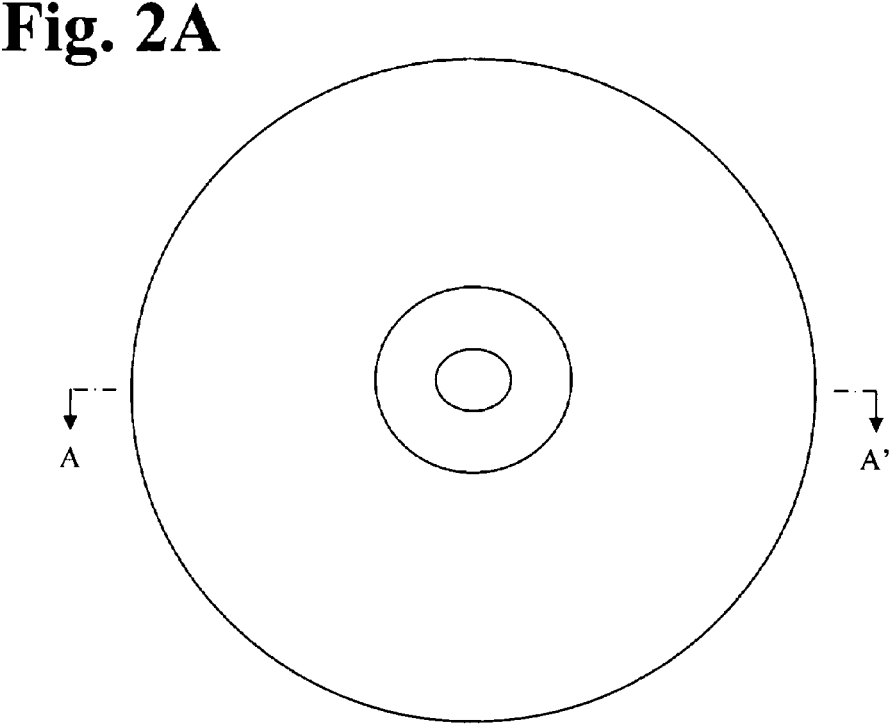
FIG. 2A shows a plan view of an optical recording disc, according to an exemplary embodiment.
Figure 2B:
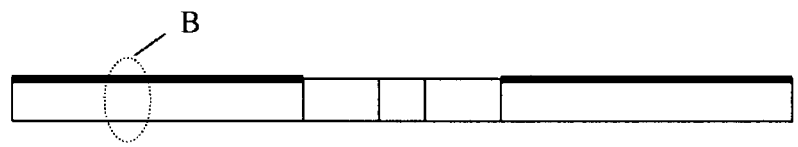
FIG. 2B shows a sectional view of the optical recording disc cut along the line AA' shown in FIG. 2A.
Figure 2C:
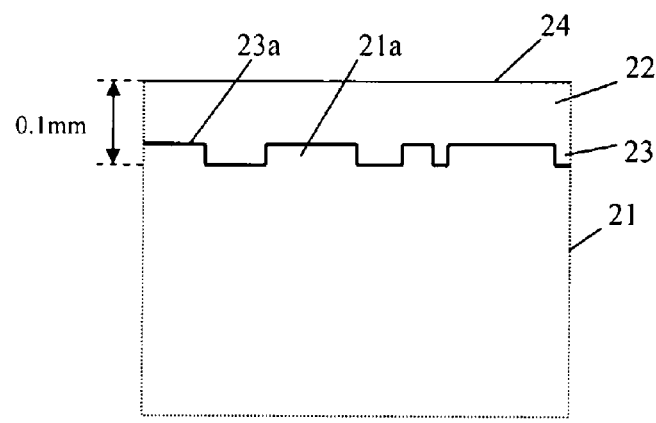
FIG. 2C shows an exploded, notional view along a track direction of section B in FIG. 2B.

An example of an optical recording disc which can be manufactured in accordance with this disclosure is shown exemplarily in FIGS. 2A through 2C. An optical recording disc 20 comprises a substrate 21 (with information bearing side 21a), an information layer 23 including a reflective layer 23a over the information bearing side 21a of the substrate 21 and a light-transmitting cover layer 22. The cover layer 21 has a thickness of approximately 0.1 mm. The optical recording disc 20 has a thickness in a range of 0.9 mm to 1.4 mm. The substrate 21 is preferably injection molded from a material used conventionally for optical disc substrates, such as polycarbonate resins, acrylic resins (for example, polymethyl methacrylate, i.e. PMMA), polyolefine resins, or the like. Since the substrate does not need to be optically transparent (because a laser beam is incident through the cover layer), the substrate may alternatively be made of another plastic material, glass, ceramics, and the like. However, if the substrate is formed through injection molding, the material of the substrate is preferably one suitable for injection molding.

The reflective layer 23a can be deposited by a sputtering process on the information-bearing side of the substrate 21. A material of the reflective layer may include a metallic element, semi-metallic element, semiconductor element, or a composite thereof. Suitable materials for the reflective layer include Al, Au, Ag, Cu, Ni, In, Ti, Cr, Pt, Si, alloy, etc. The reflective layer is preferably a thin film having a thickness of 5 nm to 200 nm.

The resin that is used to form the light-transmitting cover layer 22 can include polycarbonate, an ultraviolet curable resin (such as the type that can be used as an adhesive to bond a layer to a substrate or to another layer in an optical disc), an electron ray curable resin or another radiation curable resin. The light transmitting layer formed with such a resin should be optically transparent, exhibit low optical absorption or reflection in the laser wavelength range to be used, and have low birefringence.

A protective hard coat 24 which has properties of scratch resistance and abrasion resistance preferably covers the cover layer 22. The hard coat may be formed on the cover layer by applying a hardcoat agent composition (for example, UV hardening resin) on the cover layer, followed by curing through irradiation with active energy rays such as ultraviolet rays, electron rays or visible rays. Examples of a hardcoat composition and techniques for applying the composition are described in U.S. Patent Application Publications Nos. US2005/0072336A1, US2005/0112319A1 and US2005/0158504A1, the entire disclosures of which are incorporated by reference herein.

The substrate 21 and the information layer 23 in combination with the cover layer 22 and the protective hardcoat 24 may comply with the requirements of, for example, a BD read-only disc. For such a disc, the information layer 23 includes a series of pits embossed in a plane of land (by a stamper in the injection molding process), all of which being covered by the reflective layer 23a. In addition, the information layer 23 comprises an information track having pits with a minimum length along the track in a range of 138 nm to 160 nm. The information layer can comprise information marks configured for reading using a laser with a wavelength in a range of 400 nm to 420 nm and a numerical aperture of 0.85, and can have information capacity of 23 GBytes or more.

Figure 1:
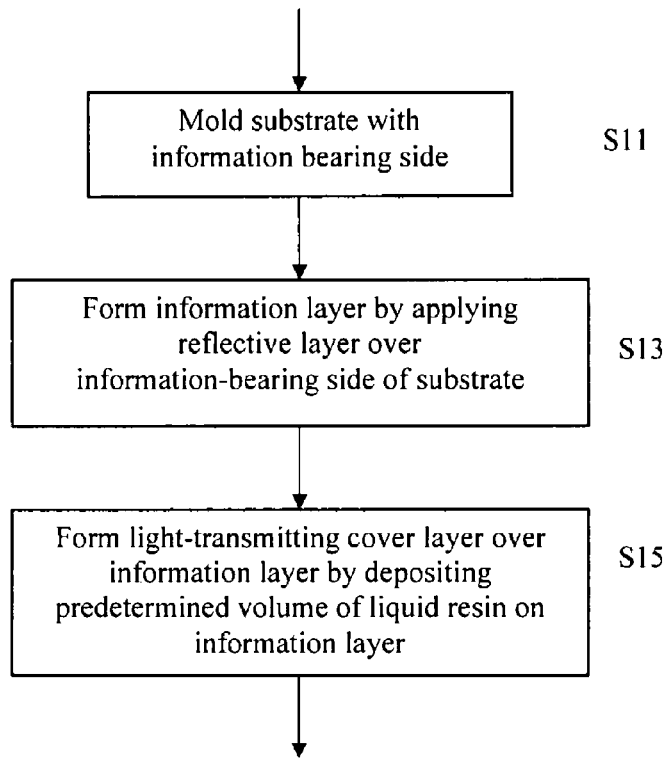
FIG. 1 shows a flow chart illustrating a method for manufacturing an optical recording medium, according to an exemplary embodiment of the present disclosure.

The disc can include one information layer (FIG. 1C) or multiple information layers (not shown). In the case of the disc having two information layers, the upper information layer (that is, closer to the light-transmitting cover layer) is covered by a semi-reflective layer (for example, gold, silicon, silver, alloy, etc.) and the lower information layer (that is, further from the cover layer) is covered by a reflective layer (for example, aluminum, etc.). Techniques for forming dual-layer discs (that is, both information layers being readable from the same disc side) are well-understood. See, for example, U.S. Pat. No. 6,117,284 and U.S. Patent Application Publications Nos. US2005/0002018A1 and US 2005/0072518A1, the entire disclosures of which are incorporated by reference herein.

The optical recording medium 10 can be single-sided or double-sided. See, for example, commonly-owned U.S. patent application Ser. No. 11/284,687, filed Nov. 22, 2005 and entitled "MULTI-PURPOSE HIGH-DENSITY OPTICAL DISC", the entire content of which are incorporated by reference herein.

It has been determined through experimentation that the deposited resin preferably has a viscosity of 10 mPa*s or less, to allow the liquid resin to flow in a desired manner to form a substantially uniform thickness. For many resins, the desired viscosity is achieved by applying heat.

For example, the method for forming the light-transmitting cover layer may further include applying a predetermined amount of heat locally to the deposited resin or a region surrounding the deposited resin, for a predetermined duration of time, to cause the deposited resin to flow over the substrate, and then removing the heat and allowing the resin to form the cover layer. The amount of applied heat preferably causes a viscosity of the resin to drop to 10 mPa*s or less.

In another example, the method for forming a light-transmitting cover layer includes heating the resin to a predetermined temperature such that the heated resin has a viscosity of 10 mpa*s or less, and then the heated resin having the viscosity of 10 mpa*s or less is applied on the information layer.

Figure 2D:
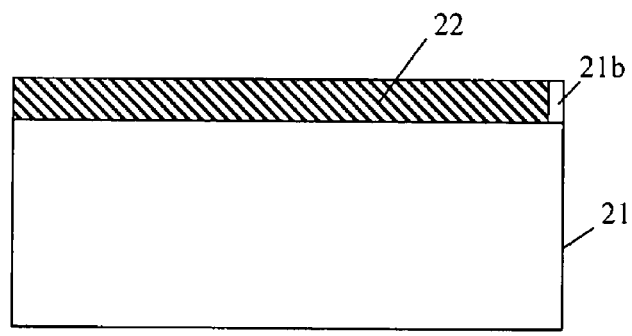
FIG. 2D shows an exploded view of an end portion of an optical recording medium which includes a disc rib.

Some liquid resins have a sufficiently low viscosity that allows the resin to flow beyond the outer disc periphery, if unimpeded. Therefore, a disc rib is preferably formed over an outer periphery of the information bearing side of the substrate, to stop flow of the deposited resin beyond the outer disc periphery (for example, disc rib 21b in FIG. 2D). For example, the disc rib may be formed along with the substrate in the molding stage (and may be the same material as the substrate). In another example, the disc rib may be a portion of the cover layer forming apparatus which is placed above the substrate before the liquid resin is applied.

In addition, maintaining the disc at a level with zero pitch when the liquid resin is deposited helps to attain a substantially uniform thickness of the cover layer. In this regard, the method for forming the cover layer may further include applying a vacuum from below the substrate. The vacuum is preferably applied before the liquid resin is deposited on the substrate and is maintained until the resin solidifies.

An example of a system for manufacturing the optical recording media of this disclosure will be described with reference to FIG. 3.

In system 30 an injection molding station 31 injects a molten transparent polycarbonate plastic into a mold cavity, having a stamper on one face to produce a clear plastic disc with pits impressed on one side. The mold cavity is configured to allow a disc rib to be formed above the outer edge of the substrate. The molded disc is placed by a robotic arm 32a in a carousel 35 which rotates to bring the disc to the metallization station 33. A robotic arm 32b then lifts the disc and brings it into the metallization station. The metallization station 33 applies a reflective metal layer coated upon the pitted surface of the disc, and then the disc is returned to the carousel 35. The disc travels upon disc transport belt 34 during which time it cools somewhat. The disc is moved by a robotic arm (not shown) from the transport belt 34 to a coating station 36.

At the coating station 36, a 0.1 mm light-transmitting cover layer is formed on the disc by depositing a predetermined volume (approximately 1.1 cm$^3$) of liquid resin, onto the surface of the disc, under a heated environment to bring the liquid resin to a viscosity of 10 mPa*s or less. Thereafter, the resin is allowed to solidify. Next, the disc is lifted by a robotic arm 32c to a curing station 37 where the disc is exposed to sufficient ultra-violet light to cure the resin. Following curing, the disc is transported to a coating station 39 where a protective hardcoat is applied.

The examples and exemplary embodiments above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

Further, in the discussion above, read-only format discs are posed as examples. It should be apparent after a reading of this patent disclosure, however, that the techniques of this disclosure apply similarly to recordable (write once read many times) and rewritable format discs.

What is claimed is:

1. An optical recording medium comprising:
   a substrate including an information bearing side;
   an information layer including a reflective layer formed on said information bearing side of said substrate; and
   a light-transmitting cover layer over said reflective layer
   a disc rib over an outer periphery of said information bearing side of said substrate and delimiting an outer diameter of said light-transmitting cover layer.

2. An optical recording medium as claimed in claim 1, wherein said information layer comprises an information track having pits with a minimum length along the track in a range of 138 nm to 160 nm.

3. An optical recording medium as claimed in claim 1, wherein said information layer comprises information marks configured for reading using a laser with a wavelength in a range of 400 nm to 420 nm and a numerical aperture of 0.85.

4. An optical recording medium as claimed in claim 1, wherein said cover layer has a thickness of approximately 0.1 mm.

5. A method for manufacturing an optical recording medium, the method comprising:
   (a) molding a substrate including an information bearing side;
   (b) forming an information layer by applying a reflective layer over the information-bearing side of the substrate;
   (c) forming a light-transmitting cover layer over said information layer by depositing a predetermined volume of a liquid resin on said information layer, wherein the predetermined volume is determined based on the formula:

(desired cover layer thickness)·π·[(cover layer outer radius)$^2$−(cover layer inner radius)$^2$]; and forming a disc rib over an outer periphery of the information bearing side of the substrate, to stop flow of the deposited resin beyond the outer disc periphery.

6. The method of claim 5, further comprising:
   (d) applying a predetermined amount of heat locally to the deposited resin or a region surrounding the deposited resin, for a predetermined duration of time, to induce the deposited resin to flow over the substrate; and
   (e) removing the heat applied in step (d) and allowing the resin to form the cover layer.

7. The method of claim 6, wherein the heat applied in step (d) causes a viscosity of the resin to drop to 10 mPa*s or less.

8. The method of claim 5, further comprising applying a vacuum from below the substrate so as to maintain the substrate at a level with zero pitch.

9. The method of claim 8, wherein said vacuum is applied before liquid resin is deposited on the substrate and is maintained until the resin solidifies.

10. The method of claim 5, wherein said cover layer has a substantially uniform thickness over the substrate.

11. The method of claim 5, wherein said cover layer has a thickness of approximately 0.1 mm.

12. The method of claim 5, wherein the liquid resin deposited in step (c) has a viscosity of 10 mpa*s or less.

13. The method of claim 5, further comprising:
    heating the resin to a predetermined temperature such that the heated resin has a viscosity of 10 mpa*s or less,
    wherein the heated resin having the viscosity of 10 mpa*s or less is applied in step (c).

14. A method for manufacturing an optical recording medium, the method comprising:
    (a) molding a substrate including an information bearing side;
    (b) forming an information layer by applying a reflective layer over the information-bearing side of the substrate;
    (c) forming a light-transmitting cover layer over said information layer by depositing a predetermined volume of a liquid resin on said information layer, wherein the predetermined volume is determined based on the formula:

(desired cover layer thickness)·π·[(cover layer outer radius)$^2$−(cover layer inner radius)$^2$], wherein said substrate formed in step (a) includes a disc rib at an outer disc periphery,
    wherein the disc rib is configured to stop flow beyond the outer disc periphery of the liquid resin deposited in step (c).

15. A method for manufacturing an optical recording medium, the method comprising:
    (a) molding a substrate including an information bearing side;
    (b) forming an information layer by applying a reflective layer over the information-bearing side of the substrate;
    (c) forming a light-transmitting cover layer over said information layer by depositing a predetermined volume of a liquid resin on said information layer, wherein the predetermined volume is determined based on the formula:

(desired cover layer thickness)·π·[(cover layer outer radius)$^2$−(cover layer inner radius)$^2$]; and forming a disc rib along with the substrate, said disc rib being formed over an outer periphery of the information bearing side of the substrate, to stop flow of the deposited resin beyond the outer disc periphery.

* * * * *